(12) United States Patent
Heinis et al.

(10) Patent No.: US 10,210,486 B2
(45) Date of Patent: Feb. 19, 2019

(54) METHOD FOR, IN PARTICULAR PREVENTIVE, MAINTENANCE OF A NON-COMPUTING APPLIANCE, SUCH AS A KITCHEN APPLIANCE

(71) Applicant: ILLINOIS TOOL WORKS INC., Glenview, IL (US)

(72) Inventors: Jacques Heinis, Chateau-Chalon (FR); Yves Lubrina, Chaussenans (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 68 days.

(21) Appl. No.: 15/317,734

(22) PCT Filed: Apr. 8, 2015

(86) PCT No.: PCT/US2015/024914
§ 371 (c)(1),
(2) Date: Dec. 9, 2016

(87) PCT Pub. No.: WO2015/191152
PCT Pub. Date: Dec. 17, 2015

(65) Prior Publication Data
US 2017/0109713 A1 Apr. 20, 2017

(30) Foreign Application Priority Data
Jun. 13, 2014 (FR) ...................................... 14 55392

(51) Int. Cl.
*G06Q 10/00* (2012.01)
*A21B 1/00* (2006.01)
(Continued)

(52) U.S. Cl.
CPC .............. *G06Q 10/20* (2013.01); *A21B 1/00* (2013.01); *G05B 23/0283* (2013.01); *G06Q 10/06* (2013.01)

(58) Field of Classification Search
CPC .......... A21B 1/00; G06Q 10/06; F03D 80/50; G05B 23/0237; G05B 23/0283
(Continued)

(56) References Cited

U.S. PATENT DOCUMENTS 8,981,930 B2 * 3/2015 Horstemeyer ......... G07C 5/006
340/3.1
9,103,323 B2 * 8/2015 Siew ....................... F03D 1/003
(Continued)

FOREIGN PATENT DOCUMENTS

WO 2009091335 A1 7/2009

OTHER PUBLICATIONS

ISR and WO for PCT/US2015/024914 dated Sep. 28, 2015.
Search Report for French Application No. 1455392 dated Feb. 5, 2015.

*Primary Examiner* — John H Le
(74) *Attorney, Agent, or Firm* — Thompson Hine LLP

(57) ABSTRACT

In a Method for maintenance of a non-computing appliance, such as a kitchen appliance, the steps are a2) identifying a datum representative of the lifetime of at least one component of the appliance, and determining a threshold value of the said datum beyond which a risk of malfunction of the component may occur, b2) monitoring the current value of the said datum of an appliance in a user's site, c2) performing a maintenance operation in respect of the appliance as soon as the current value exceeds the said threshold value, with a view to undertaking for example the replacement of the said component. in step a2), sub-steps are obtaining a reference value of the datum, obtaining information for one and the same component of several identical or similar appliances in users' sites, and calculating the threshold value on the basis of the reference value and the said information.

16 Claims, 4 Drawing Sheets

(51) Int. Cl.
*G05B 23/02* (2006.01)
*G06Q 10/06* (2012.01)
(58) Field of Classification Search
USPC ...... 702/34, 184, 185, 193; 73/168; 340/3.1, 340/539.14; 700/287; 701/31.4; 709/220
See application file for complete search history.

(56) References Cited

U.S. PATENT DOCUMENTS

| | | | | |
|---|---|---|---|---|
| 2005/0182831 A1* | 8/2005 | Uchida | ............. | G06F 11/32 709/220 |
| 2006/0070435 A1* | 4/2006 | LeMieux | ............. | F03D 15/00 73/168 |
| 2011/0144949 A1 | 6/2011 | Siew et al. | | |

* cited by examiner

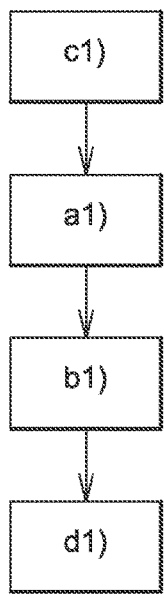
Fig. 2
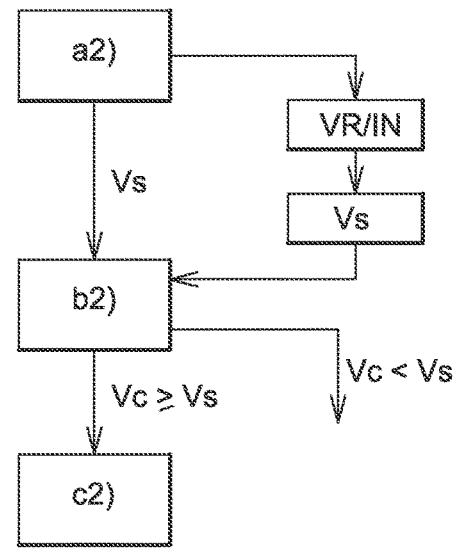
Fig. 3
| Criticality ⇒ Recurrence ⇓ | Red | Orange | Green | White |
|---|---|---|---|---|
| Red | R | R | O | G |
| Orange | R | O | G | W |
| Green | O | G | W | W |
| White | G | W | W | W |
Fig. 7

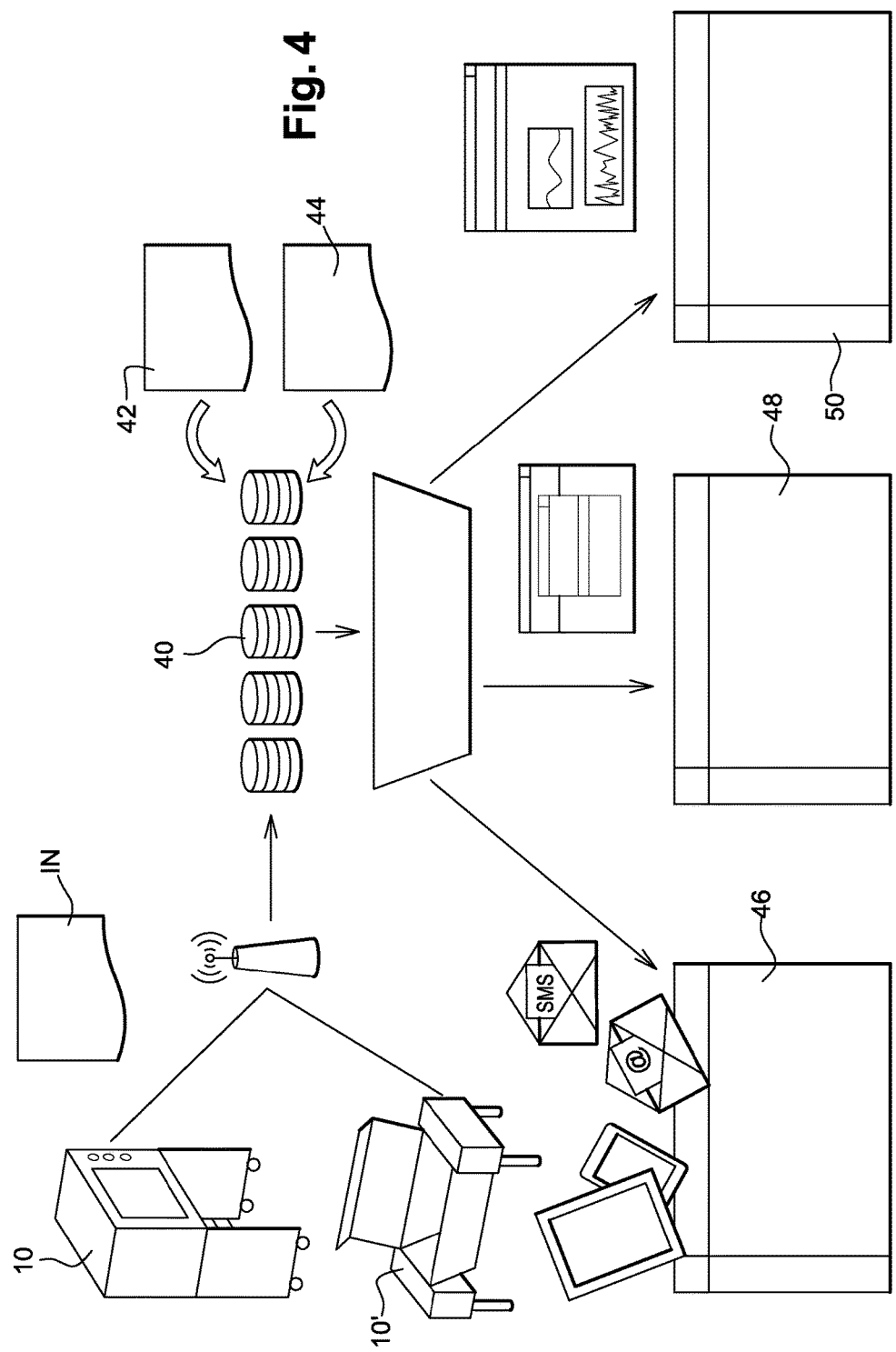

Number of
Componet Failures

Time/
Solicitations

Componet Failure
Rate

Time/
Solicitations

METHOD FOR, IN PARTICULAR
PREVENTIVE, MAINTENANCE OF A
NON-COMPUTING APPLIANCE, SUCH AS A
KITCHEN APPLIANCE

RELATED APPLICATIONS

The present application is a National Phase of International Application Number PCT/US2015/024914, filed Apr. 8, 2015, and claims priority to French Application Number 1455392, filed Jun. 13, 2014.

TECHNICAL FIELD

The present invention relates in particular to a method of maintenance, in particular preventive, of a non-computing appliance such as a kitchen appliance.

PRIOR ART

The aim of maintaining an appliance is to maintain the appliance in an operational state. This may for example consist in identifying the state of a component of the appliance and in replacing it in case of malfunction.

However, for certain appliances, it is important to ensure "preventive" maintenance consisting in replacing components before they are faulty. This is in particular the case in professional kitchens in which it is not acceptable for a kitchen appliance, such as an oven or a braiser, to break down on account of a malfunction of one of its components.

In the current art, in order to remedy this problem, the components of a kitchen appliance are therefore replaced before they are liable to exhibit a malfunction, thus making it possible to maintain the appliance in an operational state. Accordingly, maintenance operations on a cooking appliance at a customer's premises are scheduled at set intervals. In the case of an oven for example, the manager responsible for the maintenance operations may decide to set a first date for a first maintenance operation during which one or more components are changed in a preventive manner, a second date for a second maintenance operation during which one or more other components are changed in a preventive manner, etc.

However, it is appreciated that at least some of the replaced components could still be used numerous times and therefore that the maintenance operations may turn out to be premature and therefore non-optimal.

There is therefore a genuine need for a method of maintenance making it possible to optimize the maintenance operations and to trigger them only at the opportune moments.

Moreover, when a maintenance operation is performed by a maintenance operator on an appliance, the latter does not necessarily have access to the log for this appliance, and in particular to data relating to the previous maintenance operations carried out on this appliance. These maintenance data would, however, be very useful to him in order to better diagnose the state of the appliance and avoid for example replacing a component which had just been replaced during a previous maintenance operation and which would still be fully operational.

In the prior art, it has for example been proposed to record data of this type on a database at the premises of the manager responsible for the maintenance operations. However, the operator does not always think to consult this database before going to a user's premises for a maintenance operation and does not necessarily have any means of remote communication with this database in order to consult it.

The invention proposes to afford a solution to at least part of the aforementioned problems, which is simple, effective and economic.

ACCOUNT OF THE INVENTION

According to a first aspect, the invention proposes a method for maintenance of a non-computing appliance, such as a kitchen appliance, comprising the step consisting in:
a1) performing a maintenance operation in respect of the appliance, characterized in that it comprises the additional step consisting in:
b1) recording data relating to the maintenance operation in a memory integrated into the appliance.

In the present patent application, non-computing appliance is understood to mean an appliance whose prime function is not to process data. A computer is thus not a non-computing appliance. Here the non-computing appliance is preferably an electrical appliance. It may for example be a kitchen appliance, and in particular a cooking appliance, such as an oven (for example combination oven) or a braiser.

Contrary to the prior art, here the memory for storing the maintenance data is integrated into the appliance which forms the subject of the maintenance operation. A maintenance operator can thus have access to the maintenance log of the appliance, and this will aid and accelerate the diagnosis of the state of the appliance.

The method according to the invention can comprise one or more of the following steps or characteristics, taken in isolation from one another or in combination with one another:
  it comprises, before step a1), a step consisting in:
c1) consulting data relating to one or more previous maintenance operations, recorded in said memory of the appliance;
  at least one of the steps, such as b1) or c1), comprises a sub-step consisting in connecting an electronic device to the appliance, for example by means of a wireless or port-based, for example USB, connection;
  at least one of the steps, such as b1) or c1), comprises the sub-steps consisting in providing a password for access to said memory, and accessing said memory;
  the steps of the method are carried out by one and the same maintenance operator;
  the data recorded for the or each maintenance operation comprise data on the nature of the operation and/or the date of the operation and/or the number and the identity of replaced components of the appliance and/or the number and the type of tests carried out on the appliance;
  it comprises an additional step consisting in:
d1) transmitting at least part of said data to a remote computing server, for example situated at the premises of a manager responsible for the maintenance operation;
  the transmission of the data is carried out in a random manner, for example as soon as a maintenance operation has terminated;
  the appliance being equipped with sensors for measuring parameters or meters for metering parameters, step d1) furthermore consists in also transmitting at least part of the measured or metered parameters to the remote computing server; and
  the transmission of the parameters is carried out in a periodic manner, for example daily.

The present invention also relates to a non-computing appliance, for example kitchen appliance, comprising components liable to undergo a maintenance operation, characterized in that it comprises an integrated memory for storing maintenance data, and integrated means for recording maintenance data in said memory, said recording means being configured to be accessible only to a maintenance operator and/or usable only by such an operator.

The appliance according to the invention can comprise one or more of the following characteristics, taken in isolation from one another or in combination with one another:
the recording means are configured to be usable by means of a password;
the recording means are configured to be accessible by an electronic device;
the appliance comprises means of wireless or port-based, for example USB, connection to said electronic device; and
the appliance is a cooking appliance such as an oven or a braiser.

According to a second aspect, the invention proposes a method for maintenance of a non-computing appliance, such as a kitchen appliance, comprising the steps consisting in:
a2) identifying a data item representative of the lifetime of at least one component of the appliance, and in determining a threshold value of said data item beyond which a risk of malfunction of the component may occur,
b2) monitoring the current value of said data item of an appliance at a user's premises,
c2) performing a maintenance operation in respect of the appliance as soon as said current value exceeds said threshold value, with a view to undertaking for example the replacement of said component, characterized in that step a2) comprises sub-steps consisting in:
obtaining a reference value of said data item,
obtaining information on one and the same component of several identical or similar appliances at users' premises, and
calculating said threshold value on the basis of said reference value and said information.

In the present patent application, three types of values of a data item representative of the lifetime of a component are distinguished: a threshold value, a reference value and a current value. In the case where, for example, the data item representative of the lifetime is expressed in hours of use, the reference value of a component is for example 10 000 hours. Beyond 10 000 hours of use of the appliance, a risk of malfunction of the component then exists. The current value corresponds here to the effective duration of use of the appliance at a customer's premises, for example 9 000 hours at a given time. It is thus understood that the appliance could be used for another 1 000 hours before the component exhibits a risk of malfunction. However, as indicated in the foregoing, to avoid premature replacement of the component which could serve for a further 1 000 hours, the invention proposes to compare the current value (9 000 hours) not to the reference value but to a threshold value which is calculated on the basis of the reference value and additional information. In the case where the calculated threshold value is greater than the reference value, and is for example 12 000 hours, the appliance can still be used for 3 000 hours before performing the replacement of the component whose duration of use is thus optimized. In the converse case where the calculated threshold value is less than the reference value, and is for example 9 500 hours, the maintenance operation is then brought forward with respect to what was scheduled originally, thus making it possible to reduce the risk of breakdown of the appliance by malfunction of the component. As soon as the current value reaches or exceeds the threshold value (9 500 hours in the aforementioned example), a maintenance operation is performed, for example to replace the component. The invention thus allows better planning of preventive maintenance.

According to the invention, the information which is used to calculate the threshold value originates from several identical or similar appliances at users' premises, these appliances each being equipped with the same component. This information is very useful since it makes it possible to more accurately determine the effective lifetime of the component. By way of example, if one and the same component has been identified as faulty and replaced in similar appliances and used under similar conditions at a duration of use of 9 500 hours, the threshold value could be set at 9 500 hours whereas the reference value of this component is 10 000 hours.

In the present patent application, "component of an appliance" is intended for example to mean a leaktightness means such as a seal, an electrical component such as a contactor, an electrovalve, a motor, a locking means, a means for measuring a parameter such as a sensor, a heating element, a water treatment means, a lighting means, etc.

The information obtained can comprise operating data and/or maintenance data. The operating data can comprise parameters measured by sensors fitted to said appliances, parameters metered by meters fitted to the appliances, and/or anomalies detected in the appliances.

The parameters metered may simply be information arising from the appliance's control members.

The parameters measured and metered may be for example temperatures, pressures, degrees of humidity, flow-rates, numbers of operating cycles, numbers of starts of motors, durations of operation of the components, etc.

The anomalies detected are for example breakdowns and error messages. The error messages can be hierarchized as a function for example of their criticality and of their frequency of occurrence (recurrence).

The reception and the processing of the data and parameters arising from the appliances makes it possible to remotely supervise the aging of these appliances, with a view for example to improving production output quality as well as the quality of their tracking once in deployment. This also makes it possible to have a better overview of the operation of the appliances as well as their use by users. Monitoring the aging of the components will make it possible to propose preventive maintenance exactly tailored with respect to the use of the appliance. Knowledge of the profile of the use of the appliance at the customer's premises and of the lifetime of the components will make it possible to intervene at the best moment between the probability of breaking down and the premature exchange of a component.

The method according to the invention can comprise one or more of the following steps or characteristics, taken in isolation from one another or in combination with one another:
at least part of the operating data are measured by sensors fitted to said appliances;
at least part of the operating data arise from the control members of the appliances;
said data and/or parameters are transmitted by said appliances to a remote computing server, for example situated at the premises of a manager responsible for the maintenance operation;

the transmission of the data of an appliance is carried out in a random manner, for example as soon as a maintenance operation in respect of said appliance has terminated;

the transmission of the parameters is carried out in a periodic manner, for example daily;

the detected anomalies are hierarchized as a function of their criticality and of their frequency of occurrence;

at least one of steps a2) and b2) is carried out remotely, the appliance being equipped with means of remote communication;

the communication means are of the 3G or low-frequency radio wave type (for example those used by the company Sigfox);

the reference value is given by a maker or supplier of said component.

The present invention also relates to an installation for implementing the method as claimed in one of the preceding claims, characterized in that it comprises:

at least one appliance at a user's premises, this appliance being liable to form the subject of a maintenance operation, a remote computing server configured to implement steps a2) and b2), a maintenance department able to carry out step c2), the computing server comprising means for monitoring said current value, means for obtaining said reference value and said information in respect of a population of appliances, means for calculating said threshold value, means for comparing said current value with said threshold value, and means for emitting an alert for the attention of said maintenance department as a function of the results of said comparison.

The installation according to the invention can comprise one or more of the following characteristics, taken in isolation from one another or in combination with one another:

the appliance is equipped with means of remote communication, for example of 3G or low-frequency radio wave type;

the appliance is a cooking appliance such as an oven or a braiser;

the appliance comprises an integrated memory for storing maintenance data and integrated means for recording maintenance data in said memory; and the appliance comprises means of wireless or port-based, for example USB, connection to an electronic device.

DESCRIPTION OF THE FIGURES

The invention will be better understood and other details, characteristics and advantages of the invention will become apparent on reading the following description given by way of nonlimiting example with reference to the appended drawings in which:

FIG. 2 is a block diagram representing steps of a method of maintenance according to a first aspect of the invention;

FIG. 3 is a block diagram representing steps of a method of maintenance according to another aspect of the invention;

FIG. 4 is a very schematic view of an installation for implementing the method according to the invention;

FIG. 7 shows a hierarchization (by means of color codes) of the anomalies of a component as a function of their criticality and of their frequency of occurrence (recurrence).

DETAILED DESCRIPTION

Figure 1:
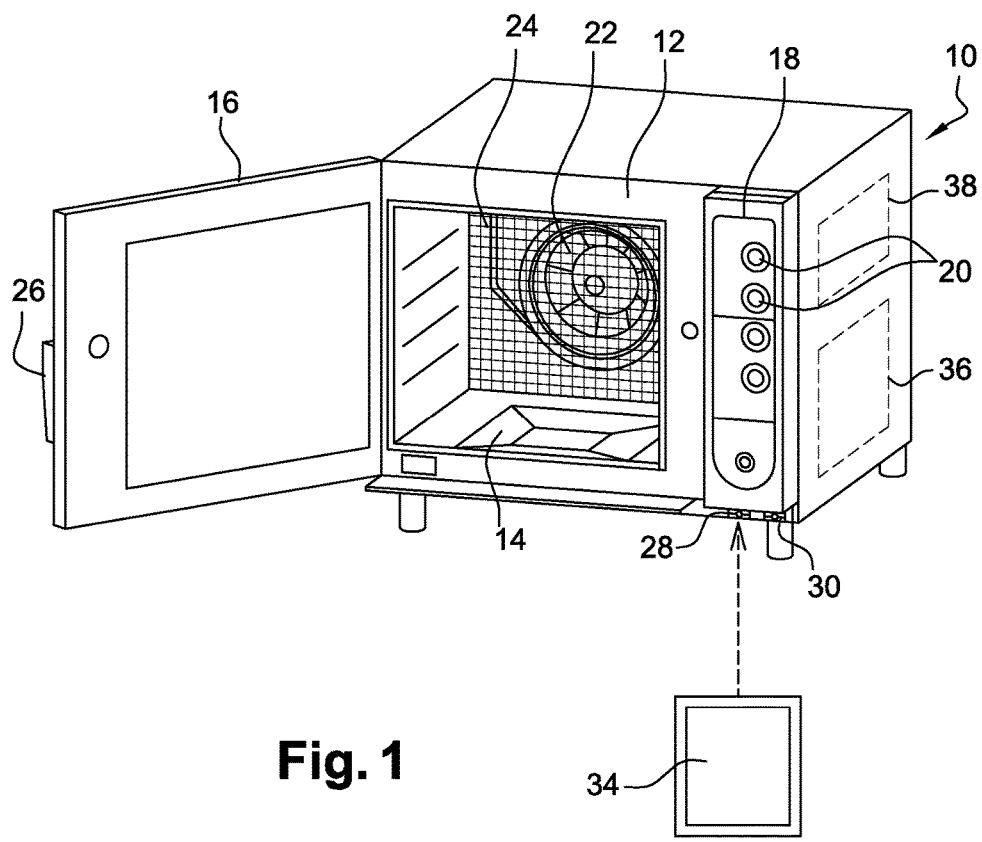
FIG. 1 is a schematic view in perspective of an appliance, here a kitchen appliance, liable to form the subject of a maintenance operation.

Reference is firstly made to FIG. 1 which represents an appliance, here a kitchen appliance, liable to form the subject of a maintenance operation with a view for example to verifying the state of components or to replacing them. Here the appliance is an oven 10 and more precisely a combination oven since it is configured to cook foods according to two modes of cooking, which may optionally be combined: blown air and steam.

Typically, the oven 10 comprises a muffle 12 defining a cooking enclosure 14 and a door 16 for closing this enclosure. The muffle 12 has several tiers (here six in number) and can accommodate several cooking trays or pans one above the other.

The oven 10 is equipped with a control panel 18 comprising selection means such as buttons 20 and display means, for example digital or with touchscreen. The buttons 20 may for example serve to adjust or select a mode of cooking, a temperature setting, etc.

The generation of steam in the enclosure 14 is obtained by means of a boiler which is associated in particular with a pump, a nozzle for injecting steam into the enclosure 14, and electrovalves (for example for supplying and for draining the boiler). The oven 10 can be equipped with other electrovalves such as an electrovalve for cleaning the enclosure 14.

For the ventilation of the enclosure 14 and the generation of blown air, the oven 10 comprises a fan 22 which is protected here by a grid 24 and which is associated with an electric motor.

The oven 10 also comprises means of electrical attachment to an electrical network and means of hydraulic attachment to a water distribution network, in particular for supplying water to the boiler.

The door 16 of the oven 10 is equipped with a handle 26 associated with locking means. This door is advantageously ventilated and is of the cold door type.

Here the oven 10 is equipped with connection means 28, 30 accessible here on the front face of the oven. Here the connection means 28 comprise a port, for example of the USB type, for the connection to the oven of an electronic device 34 such as a telephone, a tablet, a computer, etc. Here the connection means 30 comprise a plug for attachment to an electric current socket. These connection means 30 are attached to similar connection means situated in the enclosure 14 for the attachment of a core probe, which makes it possible to track the cooking temperature of a food by sticking this probe into the core of this food.

The oven 10 can comprise means for lighting the enclosure 14.

The oven 10 comprises several sensors for measuring parameters. These are for example temperature probes (muffle temperature probe, boiler temperature probe, etc.), position sensors (door sensor 16, etc.), arbitrary detectors (boiler water level probe, state detectors for the inputs and outputs of the electronic cards, number of rotations of a motor, quantity of water consumed, etc.).

The oven 10 furthermore comprises meters of parameters. These are for example monitoring systems associated with components of the oven and intended to meter operating parameters of these components such as numbers of starts/cycles, durations of operation, etc. An electronic card, equipped for example with a microprocessor, may be able to meter parameters of this type by itself.

The oven 10 can comprise several electronic cards for managing data and for controlling the various items of equipment of the oven, such as the electrovalves, the sensors, the pumps, the motors, the lighting means, the boiler, the fan 22, etc.

According to a first aspect of the invention, the oven 10 comprises an integrated memory for recording maintenance data as well as means for recording maintenance data in this memory.

According to another aspect of the invention, which can be used independently of or in combination with the first aforementioned aspect, the oven 10 comprises means of remote communication with a computing server.

According to the first aspect of the invention, the oven 10 is equipped with an integrated memory 36 which is schematically represented here by a dashed rectangle. This memory 36 is for example of the electronic or magnetic type and is linked to the data recording means which are formed here by the control panel 18 and/or by the connection means 28 (USB port). The control panel 18 can indeed comprise means for inputting maintenance data, for example by means of a keyboard or keys, or afford access to a particular mode of recording of the maintenance data. As indicated in the foregoing, the connection means 28 can be used to transmit maintenance data to the oven 10 and to record them in the memory 30, by means of the electronic device 34.

According to the invention, the oven recording means (control panel 18 and/or means of connection 28) are configured to be accessible only to a maintenance operator and/or usable only by such an operator. Thus, these data cannot be recorded on the memory by an unauthorized person such as the user of the oven for example. Access to all or part of the data recorded on the memory by the user can, however, be permitted with a view to the consultation thereof.

The recording means can be configured to be usable by means of a password. This password could for example be necessary in order to access the aforementioned particular menu accessible through the control panel 18. This password could be requested by the electronic device 34 upon its connection to the oven 10, this electronic device advantageously being equipped with appropriate software for connection and communication with the oven 10.

As a variant, the means of connection to the electronic device 34 could be of the wireless type, and for example based on IR, Bluetooth, Wifi, etc.

According to the second aspect of the invention, the oven 10 is equipped with means 38 of remote communication which can for example comprise a SIM card (in the case where the communication is effected through a telephone network, for example 3G), a modem (in the case where the communication is effected through the Internet), an emitter/receiver of low-frequency radio waves (in the case where the communication is effected through the Sigfox® network for example), etc. The means 38 are schematically represented here by a dashed rectangle.

FIG. 2 is a block diagram representing steps of a method for maintenance of a non-computing appliance according to the first aspect of the invention, which will be described in what follows in conjunction with the oven 10 of FIG. 1.

In the example represented, the method comprises four steps a1), b1), c1) and d1) of which two a1) and b1) are considered to be essential and two others c1) and d1) to be optional but recommended.

The essential steps of the method of maintenance are:
a1) perform a maintenance operation in respect of the appliance, here the oven 10, and then
b1) record in the memory 36 data relating to the maintenance operation.

The optional steps are:
c1), prior to step a1), consult maintenance data recorded in the memory 36, these maintenance data having been recorded during previous maintenance operations in respect of the oven 10; and
d1), after step b1), transmit at least part of the maintenance data to a remote computing server, for example situated at the premises of a manager responsible for the maintenance operation.

Steps a1), b1) and c1) of the method are preferably carried out by one and the same maintenance operator, directly on the site of the user where the oven 10 is situated.

The maintenance operation (step a1)) can consist in replacing one or more components of the oven 10, in carrying out tests on the oven, etc. Data relating to this maintenance operation are then recorded by the operator in the memory 36 of the oven 10 (step b1)). As explained in the foregoing, this recording can be performed directly by means of the control panel 18 or by means of the electronic device 34.

The recorded data are for example the date and time of the maintenance operation, the nature of this operation, the tests carried out, the anomalies or faults detected, the components repaired or replaced, etc.

In the case where the oven 10 has already formed the subject of maintenance operations, the operator can consult the memory 36 of the oven 10 so as to have access to the data relating to these previous operations (step c1)), before commencing the maintenance operation thereof. This can in particular aid and accelerate diagnosis thereof in case of malfunction of the oven 10.

Step d1) of transmitting the maintenance data can be carried out by the oven 10 itself by means of its means 38 of remote communication. This transmission can be performed in an automatic manner at the end of the maintenance operation. Other types of data can be transmitted to the computing server by way of the communication means 38. This is in particular the case in respect of the operating data of the oven 10, which comprise the parameters measured by the various sensors or meters of the oven, which are listed hereinabove, as well as the anomalies which may also be detected by these sensors (when for example the door 16 of the oven is poorly closed/locked, the drainage of the boiler is inoperative, a probe is not operational, the temperature of the muffle is excessive, etc.).

FIG. 3 is a block diagram representing steps of a method for maintenance of a non-computing appliance according to the second aspect of the invention and which will be described in what follows in conjunction with the oven 10 of FIG. 1.

In the example represented, the method comprises three steps a2), b2) and c2), which are:
a2) identify a data item representative of the lifetime of at least one component of the appliance, here an oven 10, and determine a threshold value $V_S$ of this data item beyond which a risk of malfunction of the component can occur,
b2) monitor the current value $V_C$ of the data item of an oven 10 at a user's premises,
c2) perform a maintenance operation in respect of the oven as soon as the current value $V_C$ exceeds the threshold value $V_S$, with a view to undertaking for example the replacement of the component.

According to the invention, step a2) comprises the substeps consisting in obtaining a reference value $V_R$ of the data item, obtaining information IN in respect of one and the same component of several identical or similar ovens at users' premises, and calculating the threshold value $V_S$ on the basis of the reference value $V_R$ and the aforementioned information IN.

By way of example, the monitored component of the oven 10 can be a motor, such as a ventilation motor of the oven 10. According to the data provided by the supplier or the manufacturer, the motor has for example a lifetime of 10 000 hours in use (that is to say it accomplishes its function and retains its properties for 10 000 operating hours of the oven 10). The data item representative of the lifetime of the component is then the number of hours in use and its reference value $V_R$, here given by the supplier, is 10 000 hours.

The threshold value $V_S$, with which the current value $V_C$ is compared, is calculated on the basis of the reference value $V_R$ (10 000 hours) and of the information IN. $V_S$ may be less than or greater than $V_R$, or indeed even equal.

The information IN comprises the maintenance data and the operating data described hereinabove, that is to say the data relating to the maintenance operations, the parameters measured by the sensors, and the anomalies observed. This information IN originates from a population of ovens 10 equipped with a similar or identical component (ventilation motor). This information IN will allow better understanding of the aging of this motor and consequently adjustment of the threshold value $V_S$, that is to say its effective lifetime.

For example, if it is observed that the ventilation motors of the ovens of the population have exhibited anomalies or have formed the subject of maintenance operations with a view to their replacement after 9 500 hours of use of the oven, the threshold value $V_S$ will be able to be set at 9 500 hours whereas the reference value $V_R$, that is to say the estimated lifetime provided by the maker, is 10 000 hours.

The information IN is preferably transmitted by the various ovens of the population to the computing server by way of their means 38 of remote communication. Steps a2) and b2) are thus carried out remotely by the computing server. Step c2) is for its part carried out by a maintenance system able to carry out a maintenance operation. This maintenance operation can be carried out remotely or at the user's site, in particular when a replacement of components is necessary.

FIG. 4 is a very schematic view of an installation for implementing the method according to the invention.

In the top right of the drawing are represented non-computing appliances, here kitchen appliances (oven 10 and braiser 10') of a population of appliances. These appliances may be at the premises of a single user or at the premises of several distinct users and therefore be remote from one another. Each appliance is equipped with means 38 of remote communication with the computing server 40. As described in the foregoing, the information IN transmitted by the appliances 10, 10' to the server 40 comprises, in particular, maintenance data and operating data (parameters measured and anomalies detected). This information IN is preferably associated with means of identification of the appliance which has emitted this information, such as an IP address for example. They can also comprise information date-stamping means such as the date and the time of transmission of this information.

The periodicity of transmission of the information IN to the server 40 can depend on the nature of said information. The maintenance data can be transmitted as soon as the corresponding maintenance operation has terminated, that is to say randomly, whereas the operating data can be transmitted more regularly, for example daily.

When a component is replaced during a maintenance operation, it is preferable that the operator in charge of this maintenance updates the data of the appliance relating to this component ("reset to zero").

The aim of the server 40 is in particular to process and to monitor the information transmitted by the appliances 10, 10'. It is in particular configured to implement steps a2) and b2) of the method according to the invention.

Here the server 40 has access to several databases, such as a database 42 of the maker of the appliances and a database 44 of the manager responsible for the maintenance of the appliances during deployment.

The data of the base 42 comprise for example information about the various components liable to form the subject of a maintenance operation, as well as their estimated lifetime (reference value $V_R$), technical analyses and autodiagnostics, etc.

The data of the base 44 comprise for example information about the population of appliances to be monitored, the subscribers, the parametrization of the alerts, analysis reports, etc.

The server 40 can be configured to transmit information or afford access to this information to three different targets, the users 46, the manager 48 responsible for the maintenance operations, and the manufacturer 50 of the appliances.

The information transmitted to the user 46 comprises for example analysis reports, notifications about the uses of the appliances, consumption reports, etc.

The information transmitted to the manager 48 comprises on the one hand information making it possible to produce a log of the events (log of breakdowns, error messages, maintenance operations, etc.) and on the other hand to supervise the population remotely and to optimize the maintenance operations. This latter information allows an overview of the operation of the appliances and a planning of the preventive maintenance. As a function of this latter information, the manager 48 will ask operators to intervene at users' premises to carry out maintenance operations.

The information transmitted to the manufacturer 50 allows supervision of the aging of the components and a profiling of the use of the appliances by users. Said information makes it possible for example to compile reports on the actual uses and lifetimes of the appliances/components, analyses of the failure/aging conditions, information about the improvement of the parametrization and autodiagnosis, etc.

Figure 5:
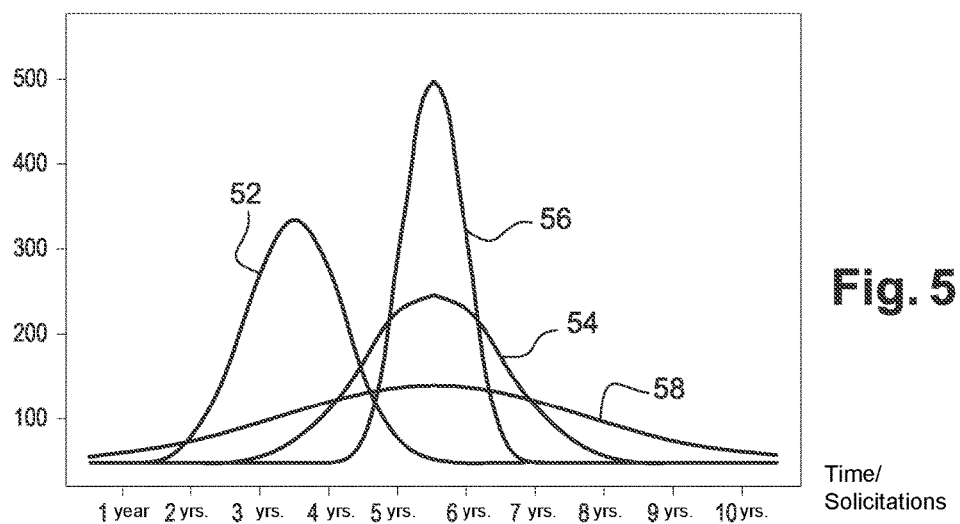
FIG. 5 is a graph showing the evolution of the number of observed failures of components as a function of usage time.
Figure 6:
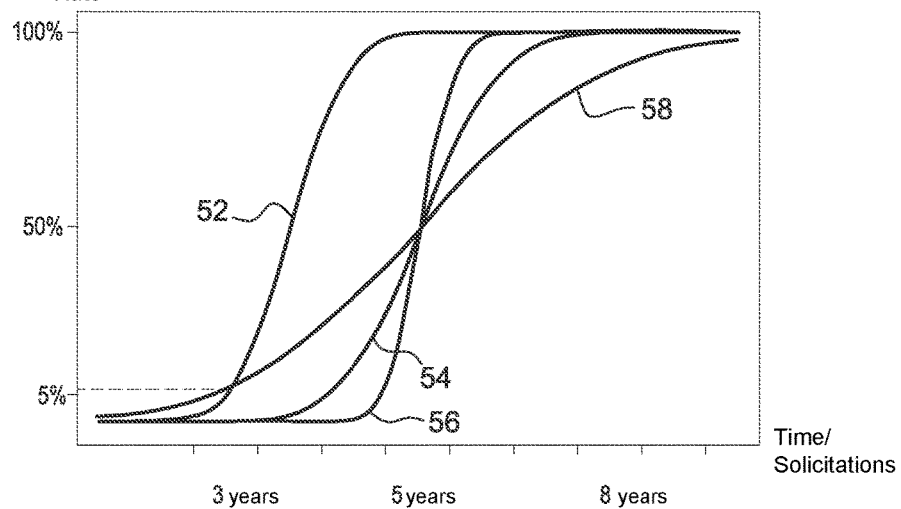
FIG. 6 represents the rate of failure of components as a function of usage time.

Concerning the lifetime of the components, FIGS. 5 and 6 show that they can differ greatly from one component to the next. It is observed that the components corresponding to curves 52 and 54 have similar behaviors, although the component corresponding to curve 52 has a shorter lifetime. It is observed that the component corresponding to curve 56 has a more targeted lifetime since 80% of the failures take place over a shorter period. On the other hand, the component corresponding to curve 58 has a lifetime which is difficult to estimate since this lifetime may be influenced by several factors. For components of this type, the estimation of the lifetime can take account of the criticality of the anomalies detected for these components. A component exhibiting an anomaly whose criticality is low will have a longer estimated lifetime than a component exhibiting an anomaly whose criticality is significant. To this criticality criterion may be added a recurrence criterion for the anomaly. The table of FIG. 7 shows a hierarchization (by means of color codes: R=Red, O=Orange, G=Green and W=White) of the anomalies of a component as a function of their criticality and of their frequency of occurrence (recurrence). R and O signify that the component must be replaced as soon as possible. G and W signify that the component must be monitored. By way of example, in the case where the temperature of an electronic card is monitored, the color codes W, G, O and R can correspond respectively to 60° C., 65° C., 70° C. and 75° C. as regards criticality, and to once, twice, 5 times and 10 times as regards recurrence. In the case where the electronic card reaches 70° C. twice, the table indicates the color code O (Orange), thus signifying that a maintenance operation correcting the cause of this fault must be performed as soon as possible.

The invention claimed is:

1. Method for maintenance of a non-computing appliance, comprising the steps of:
   a2) identifying a datum representative of the lifetime of at least one component of the appliance, and determining a threshold value of the datum beyond which a risk of malfunction of the component occurs,
   b2) monitoring a current value of the datum of the appliance in a user's site with a sensor fitted to the appliance,
   c2) performing a maintenance operation in respect of the appliance in response to the current value exceeding the threshold value, with a view to replacing the component,
   wherein step a2) comprises sub-steps of:
      obtaining a reference value of the datum,
      obtaining information for one and the same component of several identical or similar appliances in users' sites, and
      calculating the threshold value on the basis of the reference value and the information.

2. Method according to claim 1, wherein the information obtained comprises operating data of the component.

3. Method according to claim 2, wherein the operating data comprise parameters measured by sensors fitted to the appliances, parameters metered by meters fitted to the appliances, for detecting anomalies in the appliances.

4. Method according to claim 3, wherein the data and/or parameters are transmitted by the appliances to a remote computing server situated at the premises of a manager responsible for the maintenance operation.

5. Method according to claim 4, wherein the transmission of the data is performed in a random manner in response to a termination of the maintenance operation in respect of the appliance.

6. Method according to claim 4, wherein the transmission of the parameters is performed in a periodic manner.

7. Method according to claim 3, wherein the anomalies detected are hierarchized as a function of their criticality and of their frequency of occurrence.

8. Method according to claim 1, wherein at least one of steps a2) and b2) is performed remotely, the appliance being equipped for remote communication.

9. Method according to claim 8, wherein the appliance is equipped for remote communication over 3G or low-frequency radio waves.

10. Method according to claim 1, wherein the reference value is given by a manufacturer or supplier of the component.

11. Facility for implementing the method according to claim 1, the facility comprising:
    at least one appliance in a user's site, said appliance being liable to be the subject of the maintenance operation,
    a remote computing server configured to implement steps a2) and b2),
    a maintenance department able to carry out step c2),
    the computing server configured to
       monitor the current value,
       obtain the reference value and the information for a pool of appliances,
       calculate the threshold value,
       compare the current value with the threshold value, and
       emit an alert for the maintenance department in response to results of the comparison.

12. Facility according to claim 11, wherein the appliance is configured for remote communication.

13. Facility according to claim 11, wherein the appliance is a cooking appliance.

14. Facility according to claim 11, wherein the appliance comprises:
    an integrated memory for storing maintenance data of the appliance, and
    an integrated processor for recording the maintenance data in the memory.

15. Facility according to claim 11, wherein the appliance comprises a wireless or port-based connection to an electronic device.

16. Method according to claim 1, wherein the information obtained comprises maintenance data of the component.

* * * * *